United States Patent [19]

Edwards et al.

[11] 4,175,398
[45] Nov. 27, 1979

[54] CONTROL SYSTEM FOR AIR CONDITIONER

[75] Inventors: Thomas C. Edwards, Cocoa Beach; Amir L. Ecker, Cocoa, both of Fla.

[73] Assignee: The Rovac Corporation, Rockledge, Fla.

[21] Appl. No.: 858,241

[22] Filed: Dec. 8, 1977

Related U.S. Application Data

[63] Continuation-in-part of Ser. No. 769,958, Feb. 18, 1977.

[51] Int. Cl.² .............................................. F25B 45/00
[52] U.S. Cl. ........................................ 62/172; 62/149; 62/402
[58] Field of Search ................. 62/149, 172, 174, 402, 62/87, 77; 165/107 D

[56] References Cited
U.S. PATENT DOCUMENTS

| | | | |
|---|---|---|---|
| 2,475,077 | 7/1949 | Clancy | 62/62 |
| 2,715,317 | 8/1955 | Rhodes | 62/149 |
| 3,967,460 | 7/1976 | Edwards | 62/402 |

Primary Examiner—William E. Wayner
Attorney, Agent, or Firm—Leydig, Voit, Osann, Mayer & Holt, Ltd.

[57] ABSTRACT

An air conditioning system for an enclosed space which includes a compressor and expander having inlet and outlet ports with a primary heat exchanger connected between the compressor outlet port and the expander inlet port and a secondary heat exchanger connected between the expander outlet port and the compressor inlet port to complete a closed loop having a charge of air, one of the heat exchangers being thermally coupled to the enclosed space. A pump is provided for injecting air into the loop to increase the pressure therein thereby to increase the heat rate of the system. Preferably the pump is used for both injecting air into the loop and bleeding air from the loop under the control of a thermostat for maintenance of a set temperature; however, a simplified form of the invention employs constant bleed. In a more elaborate form of the invention pressure follow-up is incorporated in the control to avoid any tendency toward overshoot.

19 Claims, 6 Drawing Figures

CONTROL SYSTEM FOR AIR CONDITIONER

This application is a continuation-in-part of U.S. Application Ser. No. 769,958 filed Feb. 18, 1977 on Closed Loop Air Conditioning System Having Automatic Pressurizing Means for Variation of Heat Rate.

It is an object of the present invention to provide an air conditioning system employing a compressor-expander which permits the thermal capacity or heat rate of the unit to be greatly amplified as contrasted with prior systems, with the heat rate being continuously variable over an extremely broad range making the system capable of satisfying a wide range of thermal demand. It is a more specific object of the present invention to provide means for operating the system in a closed loop at a pressure, in the secondary heat exchanger, which may substantially exceed atmospheric pressure and which may, indeed, be smoothly varied from a point substantially below atmospheric pressure, corresponding to low heat rate, to a level which may be as high as three or even four atmospheres, with the heat rate varying substantially in proportion thereto. It is, accordingly, an object of the invention to provide an air conditioning system employing a compressor-expander of substantially reduced size and weight. Not only is the present system more compact than existing systems of the same thermal capacity but it is more efficient, making possible a substantial increase in overall coefficient of performance (COP).

It is another object of the invention to provide an air conditioning system having improved control features bringing about a corrective change in heat rate as a function of temperature and in which the control arrangement is simple, economical and highly reliable. Consequently, it is an object to provide an air conditioning system which is ideally suited for use in automobiles.

Other objects and advantages of the invention will become apparent upon reading the attached detailed description and upon reference to the drawings in which.

While the invention has been described in connection with certain embodiments, it will be understood that we do not intend to be limited to the particular embodiments shown but intend, on the contrary, to cover the various alternative and equivalent forms of the invention included within the spirit and scope of the appended claims.

Figure 1:
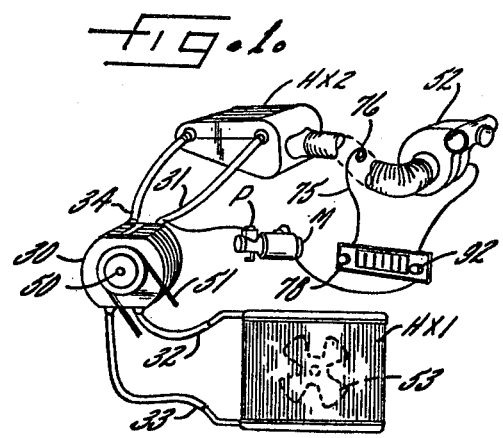
FIG. 1 is a diagram, partially in perspective, showing the components employed in an automobile air conditioner embodying the present invention.
Figure 2:
FIG. 2 is a schematic diagram of the control system of the type employed in FIG. 1.
Figure 2:
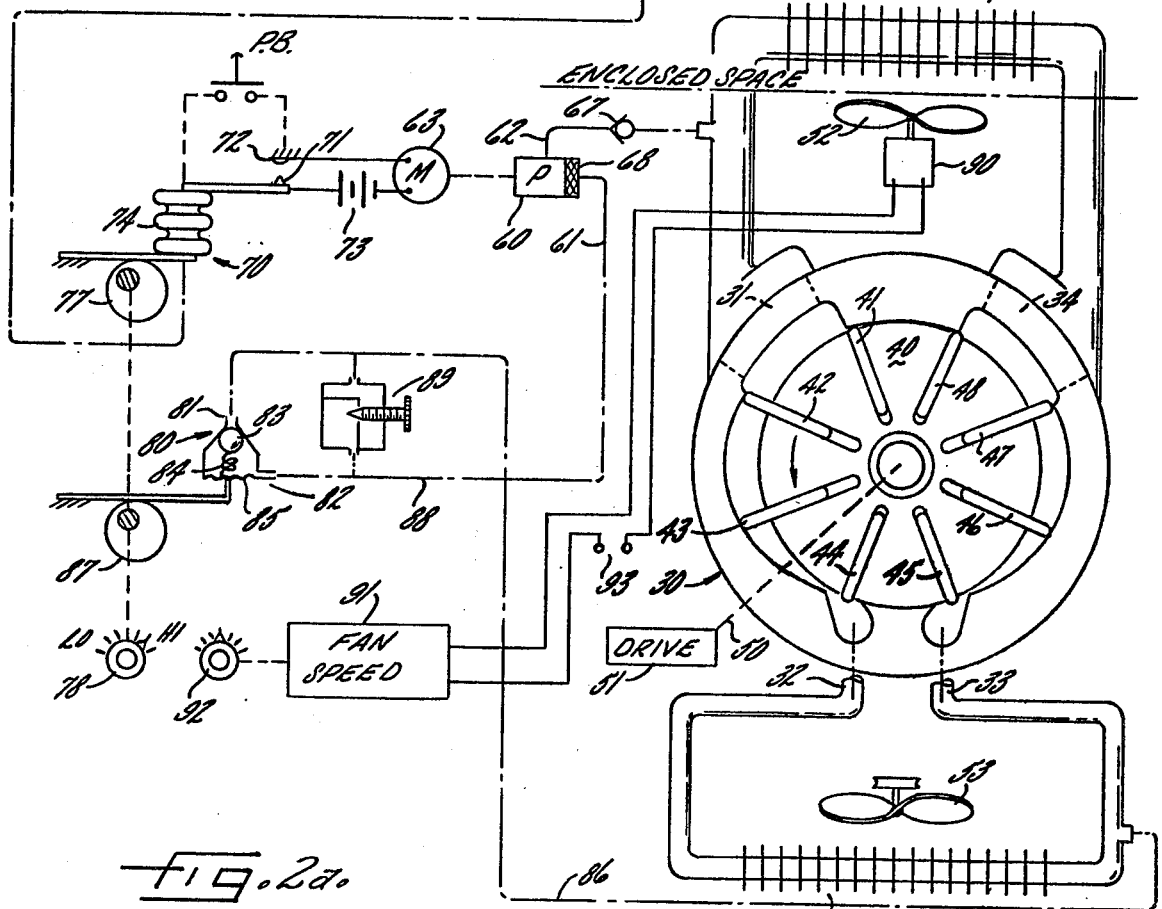

Turning now to FIGS. 1 and 2 there is shown, in simplified form, an air conditioning system 30 utilizing a compressor-expander which may be constructed as set forth in prior U.S. Pat. No. 3,904,327 which issued on Sept. 9, 1975.

It will suffice for present purposes to say that the device includes a vaned rotor rotating in a chamber of elliptical section, the chamber defining a compressor side having inlet and outlet ports 31, 32 and an expander side having inlet and outlet ports 33, 34. The rotor, indicated at 40, has a set of vanes 41-48, the rotor being driven by a shaft 50 having a drive connection 51.

Connected between the compressor outlet port 32 and the expander inlet port 33 is a primary heat exchanger HX1 in which heat is liberated. Similarly, connected between the expander outlet port 34 and the compressor inlet port 31 is a secondary heat exchanger HX2 in which heat is absorbed. In the embodiment of the invention to be described it will be assumed that the system is being used for air conditioning or refrigeration, with the heat exchanger HX2 coupled to an enclosed space by means of a fan or blower 52 and with heat exchanger HX1 in the ambient atmosphere, the ambient air being driven through it by a fan 53 which may, for example, be the radiator fan of an automobile.

In operation, air which is drawn in at the inlet opening 31 is compressed and experiences an increase in temperature, being discharged to the heat exchanger HX1 where the temperature is restored to the ambient level. The air, still under pressure, is fed to the expander inlet port 33 where it is permitted to expand, accompanied by an abrupt drop in temperature. The cold air is discharged from the outlet port 34 into the secondary heat exchanger HX2, in which heat is subtracted from the air being fed by the blower 52 into the enclosed space.

Figure 4:
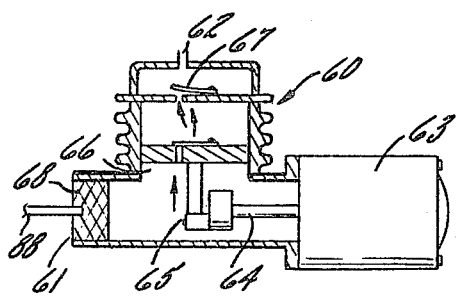
FIG. 4 is an elevational view, on a reduced scale, and partly in section, of a motorized piston pump of a type which may be employed in FIG. 2.

In accordance with the present invention a source of auxiliary air is provided with injecting means preferably in the form of a pump for controllable injection of air from the source into the closed loop, enabling the secondary heat exchanger to operate at a pressure substantially greater than atmospheric thereby to increase the heat rate of the system. More specifically, means are provided for varying the pressure in the closed loop under the control of a thermostat to provide corrective variation in the heat rate of the system as necessary to maintain a set temperature in the enclosed space. Thus referring to FIGS. 2 and 4, a pump 60 is provided having an inlet 61 and an outlet 62, the pump being energized by an electric motor 63 including a shaft 64. The pump, which is of the piston type including a crank 65, has inlet and outlet valves 66, 67 in the form of a vane or reed. Interposed in the inlet 61 is a porous filter 68.

For the purpose of energizing the pump motor when the enclosed space "calls for cold", a thermostat 70 is provided having contacts 71, 72 which are connected in series with a current source such as the car battery 73 and which may be shunted by a manual push button PB. The thermostat includes a bellows 74 which is connected by a capillary 75 to a bulb 76 which may be either in the enclosed space or in the path of the air leading to the enclosed space (as illustrated in FIG. 1). For adjusting the set temperature the position of the bellows is determined by a cam 77 under the control of a knob 78. In operation, then, when the pressure rises in the space accompanied by expansion of the bellows, contacts 71, 72 close thereby energizing the motor 63 to rotate the pump 60 for injection of air into the system. Thus a greater mass of air is handled, per revolution, in the compressor-expander, increasing its heat rate so that more heat is absorbed in the secondary heat exchanger to bring about a corrective lowering of the temperature in the enclosed space.

In the simplest aspect of the invention, the compressor-expander 30 or any component of the system may be constructed to have slight inherent air leakage so that in the event the temperature in the space tends to go below the set value the gradual reduction in pressure in the loop, by reducing the heat rate, will enable the temperature to rise correctively.

Further in accordance with the invention means are provided for obtaining more prompt relief of the pressure in the loop (than is brought about by leakage alone) by providing a variable relief valve which is coupled to the temperature control knob. Thus a valve 80 is used having an inlet 81 and an outlet 82, the inlet being coupled to the primary heat exchanger by a line 86. The valve includes a ball 83 biased against a seat by a spring 84, the lower end of the spring being supported upon a diaphragm 85. The diaphragm is positioned by an auxiliary cam 87 coupled to the control knob 78 in such sense that the lower is the set temperature, the higher is the spring force. Conversely, then, an increase in the temperature setting of the knob 78 not only serves to set the thermostat 70 to a higher temperature but decreases the relief setting of the valve 80, causing a prompt partial dumping of air into the outlet 82 to produce an immediate lowering of the heat rate. It is one of the features of the system disclosed in FIG. 2 that the discharged air, instead of being discharged directly to the atmosphere, flows instead through a line 88 which discharges into the filter 68 at the pump inlet so that any lubricant which may be entrained in the air is conserved and has no polluting effect.

In lieu of relying upon natural leakage of air to bring about a gradual decrease in heat rate, a needle valve 89 may be used connected in shunt with the valve 80 or, if no adjustment in leakage rate is necessary, the seat in the valve 83 may be scored or a ball having a roughened surface may be used.

Means are also provided in the system of FIGS. 1 and 2 to vary the speed of the blower 52 thereby to vary the rate of discharge of air into the enclosed space. This is accomplished by connecting the blower motor, indicated at 90, to a fan speed controller 91 which, in its simplest aspect may be a variable resistor having a knob 92, to control flow of current from a source 93.

Figure 2A:
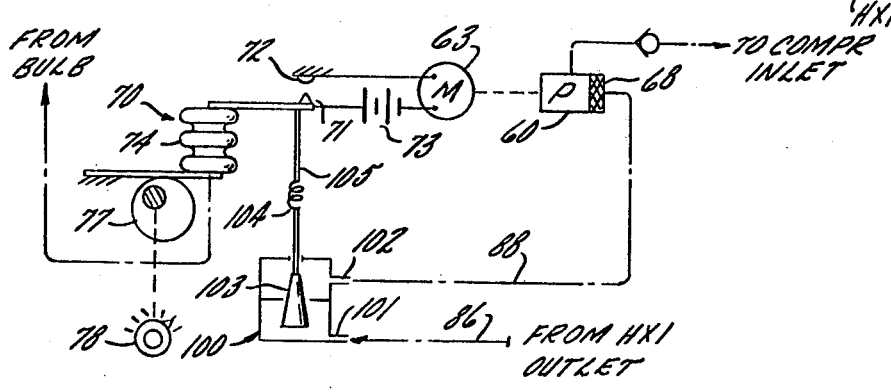
FIG. 2a is a fragmentary schematic illustrating thermostatic control of the bleed function and applicable to the system of FIG. 2.

In the embodiment of FIGS. 1 and 2, a constant rate of bleed or leakage was assumed. However, if desired, and in accordance with one of the aspects of the present invention, bleeding of air may be placed under the control of the thermostat so that the thermostat correctively energizes the pump when the temperature in the space rises and correctively opens a bleed opening when the thermostat senses that the temperature is too low. Thus the thermostat 70 is coupled to a controlled bleed valve 100 having an inlet 101 and an outlet 102, the valve including a tapered needle-like plunger 103 which is connected via a spring 104 and actuator 105 to the responsive side of the bellows 74. As previously stated, when the temperature in the space rises, contacts 71, 72 close to pressurize the system. Using the system of FIG. 2a, the converse may now occur: when the temperature in the space is too low, resulting in contraction of the bellows, the plunger 103 is lowered to create a bleed opening permitting air from the primary heat exchanger to pass through lines 86, 88 for discharge at the filter 68 of the pump. The accommodation provided by the spring 104 establishes a narrow dead band between the two control functions.

Figure 3:
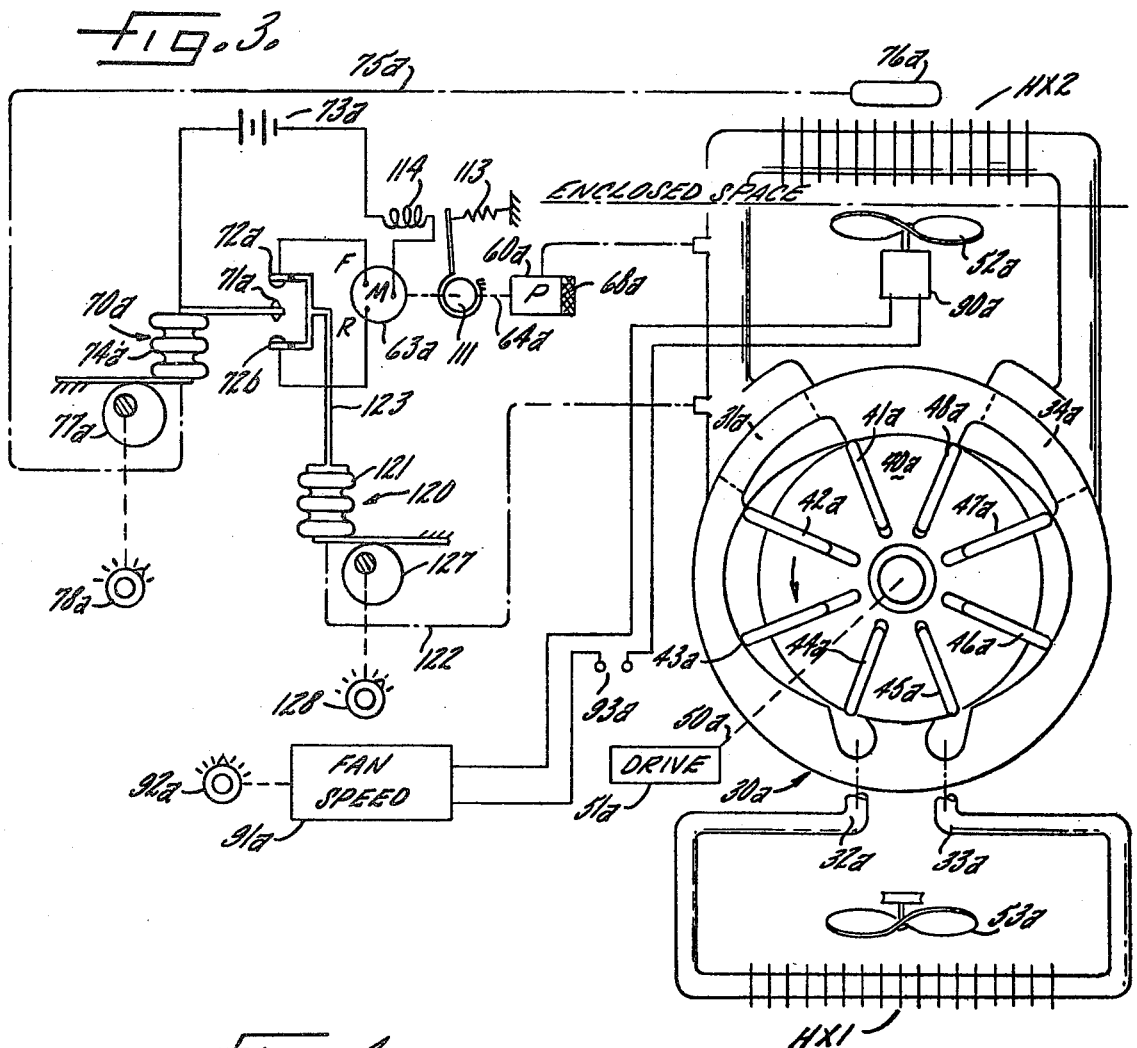
FIG. 3 is a schematic diagram of a control system similar to FIG. 2 but including additional features.
Figure 5:
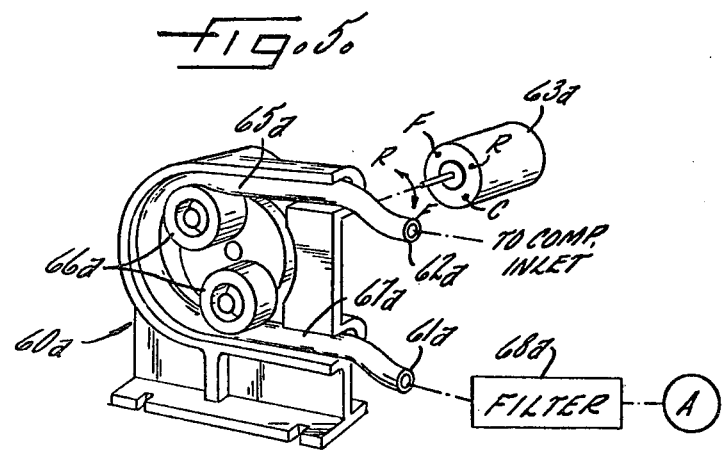
FIG. 5 is a perspective view of a positive displacement peristalic pump with reversible motor drive usable in the system of FIG. 3.

In accordance with one of the versions of the present invention a reversible pump of the positive displacement type is interposed between the source and the loop with reversible control means for driving the pump in opposite directions for (a) injection of air from the source into the loop to increase the heat rate of the system and for (b) alternatively bleeding air from the loop back to the source thereby to reduce the heat rate of the system. A schematic diagram showing an air conditioning system which provides such dual usage of the pump is illustrated in FIG. 3 where corresponding numbers, with subscript "a", have been used to indicate corresponding parts. Thus the thermostat 70a, in addition to having the regular contacts 71a, 72a, is provided with a contact 72b, the contacts 72a and 72b being connected respectively to forward and reverse terminals F, R on the motor 63a. The pump, indicated at 60a, in addition to being of the positive displacement type, is direction-sensitive, that is, fluid flows in one direction or the other through the pump depending upon the direction of rotation of the drive shaft. A pump fulfilling this requirement is illustrated at 60a in FIG. 5. It will be recognized as a pump of the so-called "peristalic" type having a driven rotor 65a carrying rollers 66a which cooperate with a loop of resilient tubing 67a having respective ends 61a, 62a. When the forward terminal F of the motor is energized, causing the shaft 64a to rotate in the clockwise direction, air is sucked through the filter 68a into the tubing at 61a and discharged into the compressor inlet thereby progressively increasing the pressure in the loop to increase the heat rate of the system. Conversely when the thermostat calls for a decrease in heat rate by closing contacts 71a, 72b, the reverse terminal R of the motor is energized causing the shaft to rotate counterclockwise so that air is pumped, or bled, from the compressor inlet into the tubing at 62a with discharge, at 61a, into the filter 68a, resulting in a lowering of loop pressure and a consequent decrease in heat rate, that is, a decrease in the amount of "cold" being supplied to the controlled space. Under conditions of equilibrium when neither of the two thermostat contacts is closed, the tube in the pump is sealed by the rollers so that the loop pressure remains constant.

One advantage of employing a motor of the peristalic type is that it will resist "motor action" under the influence of loop pressure during times when the drive motor is stationary. However, if difficulty is experienced with motor action using a particular design of pump, an automatic brake 110 may be coupled to the shaft 64a. Such brake includes a drum 111 and band 112 normally energized by a spring 113 when the motor is not rotating. A solenoid 114 coupled to the motor circuit is, however, energized when the motor is turned on to overcome the spring 113 and to release the brake thereby to permit normal shaft rotation. Alternatively an anti-retrograde connection may be interposed in the shaft 64a between the pump and the motor and which may, for example, take the form of a worm and worm wheel to serve with equal effectiveness in preventing unwanted motoring by the pump.

In accordance with one of the more detailed features of the present invention provision is made in the system for pressure follow-up so that a change in the loop pressure called for by the thermostat and resulting from energization of the motor will act automatically to restore the motor to its off condition thereby to prevent pressure overshoot and the possibility of hunting. Where the bulb of the thermostat is located directly in the path of the cooled air which is discharged into the space (FIG. 1), the thermostat will react sufficiently promptly to a change in the temperature of the discharged air to minimize the possibility of overshoot even without the follow-up function. However, where the thermostat bulb is located in the space remotely from the point of discharge, there is risk that the pressure may reach an extreme level before the corrective change is sensed. Thus a follow-up mechanism is provided as indicated at 120 in the form of a bellows 121 having a pressure line 122 communicating with the loop, with the free end of the bellows controllinhg a follow-up, or output, member 123 upon which the contacts 72a, 72b are mounted. For adjustment purposes the bellows is positioned by a cam 127 under the control of a knob 128.

In operation, when the thermostat "calls for cold" contacts 71a, 72a close energizing the motor in the forward direction causing the pump 60a to pump air into the loop. The pressure in the loop, sensed through line 122, thereupon expands the bellows 121 to lift the contact 72a from the contact 71a to cut off further increase in pressure. Where the disparity in temperature sensed by the thermostat is only slight, such cut off will occur almost immediately, whereas if the temperature disparity from the set point is great, a correspondingly great increase in pressure will have to occur in the loop to achieve separation of the contacts. The result is that proportional action is achieved so that a change in pressure in the loop, and hence change in heat rate, is automatically tailored in accordance with the departure of the temperature in the space from the set point. The converse occurs when the temperature in the space becomes too low. In such event the action of the follow-up mechanism 120 produces separation of contacts 71a, 72b, to turn off the pump motor, before the loop pressure can become excessively low.

It is one of the unusual features of the system disclosed in FIG. 3, and a part of the present invention, that the pressure in the secondary heat exchanger is variable both above and below the atmospheric level. Thus the same pump 60a which serves to inject additional air into the loop to increase the pressure in the secondary heat exchanger above the atmospheric level also serves as a vacuum pump to partially evacuate the secondary heat exchanger when the system is running "light". This permits the system to modulate downwardly to substantially zero heat rate under idling conditions when no "cold" is called for by the thermostat 76a. The effect of operation both below and above atmospheric pressure in the secondary heat exchanger provides an extremely wide swing in the heat rate, a swing in excess of that normally thought to be achievable.

Operation of the system with a vacuum existing in the secondary heat exchanger is also possible in the system of FIG. 2 since the bleed valve 89 bleeds air under pressure from the primary heat exchanger which normally operates at a pressure on the order of three times as great as the secondary heat exchanger.

It may be noted that in both of the systems illustrated in FIGS. 2 and 3 the pump is coupled to the compressor inlet port, that is, to the secondary heat exchanger. This is a preferred connection since the pump can pressurize the system without having to work against the higher level of back pressure which exists at the compressor outlet, that is, in the primary heat exchanger. It will be understood, however, that the invention contemplates coupling the pump to any position in the loop.

The invention has been described in connection with the refrigeration aspect of an air conditioning system. It will be understood, however, that the invention is not limited thereto and, if desired, the primary heat exchanger HX1 may be coupled to the enclosed space for heating the same as typically required in the winter season. The only change in the control system required in such event is that the sense of the thermostat and pressure follow-up mechanism must be reversed from that shown in the drawings. That is to say, instead of the thermostat 70 closing contacts 71, 72 when the temperature in the space rises, the opposite must occur, that is, the contacts must be oriented to close upon contraction, and not expansion, of the bellows. One skilled in the art will recognize that a similar inversion must be made in the follow-up mechanism. Specifically, the control system may be switched from summer to winter operation by the simple expedient of reversing the F and R connections on the motor and by inverting the bellows to present a lower free end instead of an upper free end to which the element 123 is secured, so that the latter falls instead of rises upon an increase in loop pressure. The two heat exchangers may be effectively reversed in location by suitable transfer valves, for example of the type disclosed in co-pending U.S. application Ser. No. 733,751 filed Oct. 26, 1976, a matter well within the skill of the art.

In the various embodiments of the invention discussed above a bellows has been described and illustrated as a transducing element, with the motion of the bellows being utilized as an output signal representative of the condition being responded to. However, it will be understood that this has been done simply for ease in understanding and the invention is by no means limited to a bellows as a transducing element; other types of transducers capable of producing an output signal which varies in accordance with changes in a condition may be utilized with equal advantage.

Also while the invention has been described primarily in connecton with its use in an automobile, it will be understood that the term "enclosed space" refers to any enclosed space, the temperature of which is to be controlled.

And while it is preferred to employ air as the gaseous medium, and while that term has been employed for the sake of convenience in terminology, it will be understood that the invention is not limited to use with atmospheric air and substitute gases having characteristics similar to air, and which are non-condensing within the range of temperature and pressure encountered within the device, may be utilized. Usage of substitute gases is particularly practical in connection with the system illustrated in FIG. 3 and utilizing a pump of the type shown in FIG. 5 since the connection 61a of the flexible tubing 67a may be connected to a pressurized and sealed pneumatic accumulator, indicated at A in FIG. 5, of commercially available type, thereby conserving the gas and avoiding discharge of the gas into the atmosphere.

Although it will normally be convenient to drive the pump by an auxiliary motor, as shown, the invention is not limited to this and, if desired, the pump may be coupled to the same motor that drives the rotor shaft with a controllable clutch being interposed in the coupling for turning the pump on and off or for driving it in opposite directions under the control of the control signal. The term "control signal" as used herein includes a manual signal as derived, for example, from the pushbutton PB and consequently the term "control means" includes manual control means.

What is claimed is:

1. In an air conditioning system for an enclosed space, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of single phase gaseous refrigerant, the refrigerant being constantly in the gaseous state throughout the loop, one of the heat exchangers being thermally coupled to the enclosed space, a source of single phase gaseous refrigerant, heat rate control means for changing intermittently the heat rate of the system while maintaining the refrigerant in a gaseous phase throughout the loop under all operating conditions, said heat rate control means including an auxiliary pump of the positive displacement type interposed between the source and the loop and having a driving motor for progressively injecting single phase refrigerant from the source into the loop to increase the pressure in the secondary heat exchanger to substantially above the atmospheric level, control means including a control device correctively settable in response to the temperature of the air in the enclosed space to produce a control signal for energizing the driving motor to pump single phase gaseous refrigerant into the loop to increase the pressure in the loop and thereby increase the heat rate of the system, and bleeding means for progressively bleeding single phase refrigerant from the loop back to the source for decreasing the loop pressure and thereby decreasing the heat rate of the system so that an equilibrium pressure tends to be established in the secondary heat exchanger which is in accordance with thermal load on the system.

2. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, an auxiliary pump of the positive displacement type interposed between the source and the loop and having a driving motor, means for energizing the driving motor to increase the pressure in the loop and thereby increase the heat rate of the system, the loop having bleeding means for decreasing the loop pressure and thereby decreasing the heat rate of the system, wherein the pressure in the secondary heat exchanger is variable both above and below the atmospheric level.

3. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, an auxiliary pump of the positive displacement type interposed between the source and the loop and having a driving motor, means for energizing the driving motor to increase the pressure in the loop and thereby increase the heat rate of the system, the loop having bleeding means for decreasing the loop pressure and thereby decreasing the heat rate of the system, wherein the bleeding means is in the form of a small orifice associated with the primary heat exchanger for venting the primary heat exchanger to the atmosphere thereby to reduce the pressure in the secondary heat exchanger below the atmospheric level.

4. In an air conditioning system or in an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, an auxiliary pump of the positive displacement type interposed between the source and the loop, and driving means including control means for driving the pump in opposite directions for (a) injection of air from the source into the loop to increase the pressure in the secondary heat exchanger to substantially above the atmospheric level thereby to increase the heat rate of the system and for (b) alternatively bleeding air from the loop back to the source thereby to reduce the heat rate of the system.

5. The combination as claimed in claim 4 in which the pump is coupled to the secondary heat exchanger so that the pump serves alternatively as a pressure pump and as a vacuum pump.

6. The combination as claimed in claim 4 in which the source is an accumulator for conserving the bled air and to avoid discharging the same into the atmosphere.

7. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, injecting means including an auxiliary pump having a drive motor and control means therefor for injecting air from the source into the closed loop to increase the pressure in the secondary heat exchanger to substantially above atmospheric level thereby to increase the heat rate of the system, the combination further including means for preventing retrograde movement of the pump so that the pump is incapable of rotating by motor action by reason of the pressure existing in the loop.

8. The combination as claimed in claim 7 in which the retrograde preventing means is in the form of a check valve interposed between the pump and the loop.

9. The combination as claimed in claim 7 in which the retrograde preventing means is in the form of a non-reversible drive coupling interposed between the driving means and the pump.

10. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port aand the compressor inlet port to complete a closed loop having a charge of air, a source of air, an auxiliary pump interposed between the source and the loop and having a drive motor for injecting air from the source into the loop to increase the pressure in the secondary heat exchanger to substantially above the atmospheric level thereby to increase the heat rate of the system, means including a thermostat in the air entering the enclosed space for correctively controlling the motor, and means of gradually bleeding air from the loop to reduce the heat rate of the system, the combination further including an oil filter interposed between the pump and a source of air and connected in the path of the bled air to capture particles which may be entrained in such air.

11. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven; a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, an auxiliary pump of the positive displacement type interposed between the source and the loop and having a driving motor, a thermostat subject to the air entering the enclosed space for energizing the motor for injecting air from the source into the loop to increase the pressure in the loop and thereby increase the heat rate of the system, the loop having a spring pressed relief valve for venting air from the loop and a common adjusting member coupled to the thermostat and coupled to the spring of the valve for coordinated changing of the settings thereof.

12. The combination as claimed in claim 11 in which the inlet of the pump is provided with a filter and in which the outlet of the relief valve is connected to the filter so that any particles entrained in the vented air are retained in the pump.

13. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, an auxiliary pump of the positive displacement type interposed between the source and the loop and having a driving motor, means for energizing the driving motor to increase the pressure in the loop and thereby increase the heat rate of the system, the loop having bleeding means for decreasing the loop pressure and thereby decreasing the heat rate of the system, the control means is in the form of a thermostat subject to the air entering the enclosed space and the bleeding means is in the form of a small aperture for intentional and gradual leakage of air from the loop.

14. In an air conditioning system for an enclosed space and for operation in ambient air, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected the compressor outlet port and the expander inlet port, a secondary heat exchanger connected between the expander outlet port and the compressor inlet port to complete a closed loop having a charge of air, the air being constantly in the gaseous state throughout the loop and free of any phase changing restriction in the form of a capillary or the like, an auxiliary pump interposed between the ambient air and the loop and having a driving motor for progressively injecting ambient air under pressure into the loop to increase the pressure in the secondary heat exchanger to substantially above the atmospheric level thereby to increase the heat rate of the system, control means including a control device correctively settable in response to the temperature of the air in the enclosed space for intermittently operating the motor so that ambient air is pumped into the loop to increase the pressure in the loop thereby to increase the heat rate of the system, and bleeding means interposed between the loop and the ambient air for progressively bleeding air from the loop back to the ambient air to reduce the heat rate of the system so that an equilibrium pressure tends to be established in the secondary heat exchanger which is in accordance with the thermal load on the system.

15. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, a source of air, an auxiliary pump interposed between the source and the loop and having a drive motor for injecting air from the source into the loop to increase the pressure in the secondary heat exchanger to substantially above the atmospheric level thereby to increase the heat rate of the system, means for bleeding air from the loop to decrease the pressure in the secondary heat exchanger to decrease the heat rate of the system, and means including a thermostat in the air entering the enclosed space for alternatively operating the motor and bleeding means depending upon whether the temperature is above or below the temperature control point thereby tending to restore the temperature to the control point.

16. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, an auxiliary pump of the positive displacement type interposed between the source and the loop, the pump having a reversible driving motor, and control means including a thermostat in the air of the enclosed space for controlling the driving motor so that when the temperature in the space is warmer than that for which the thermostat has been set the drive motor rotates in one direction and when the temperature in the space is cooler than that for which the thermostat has been set the drive motor operates in the opposite direction thereby to tend to maintain a constant temperature in the space.

17. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, an auxiliary pump interposed between the source and the loop and having driving means, primary control means coupled to the driving means for energizing the driving means to increase the pressure in the loop and thus the heat rate of the system, follow-up control means including a pressure sensing device coupled to the loop for de-energizing the driving means upon said increase in pressure so that pressure tends to be maintained in the loop in accordance with the setting of the primary control means.

18. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, an auxiliary pump interposed between the source and the loop and having driving means, a thermostat subject to the air entering the enclosed space and coupled to the driving means so that when the air in the enclosed space departs from the temperature at which the thermostat has been set a control signal is produced which controls the driving means for driving of the pump to produce a corrective change in pressure in the loop, and means responsive to the resulting change in pressure in the loop for applying a follow-up signal to the driving means to shut off the pump thereby tending to prevent overshoot of the change in pressure.

19. In an air conditioning system for an enclosed space, the combination comprising a compressor having an inlet port and an outlet port, an expander having an inlet port and an outlet port, the compressor-expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of air, an auxiliary pump of the reversible positive displacement type interposed between the source and the loop and having a reversible driving means, a thermostat controllably coupled to the driving means for energizing the driving means for rotation in one direction or the other depending upon whether the temperature of the air is above or below that for which the thermostat has been set, and follow-up means responsive to a resulting change of pressure in the loop for de-energizing the driving means thereby to prevent overshoot of the change in pressure.

* * * * *